March 2, 1954 P. A. STEPHENSON 2,670,679
DUPLICATOR CYLINDER BEARING
Filed June 11, 1949 2 Sheets-Sheet 1
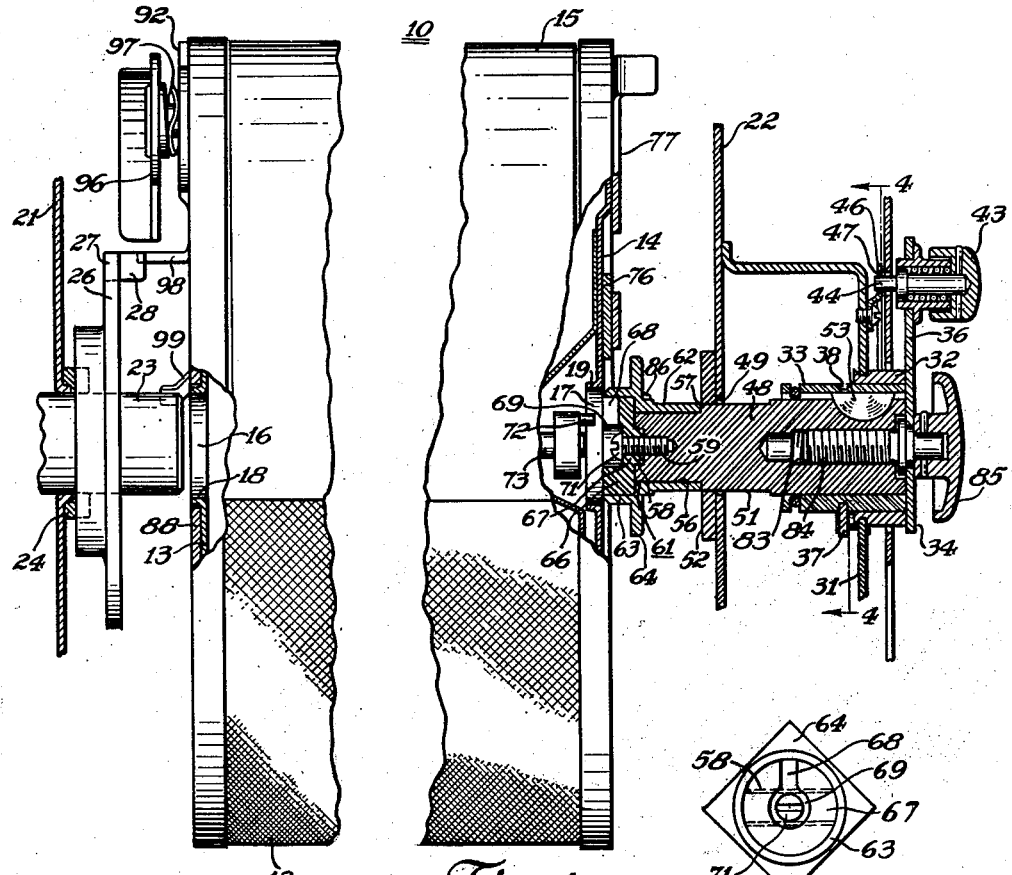
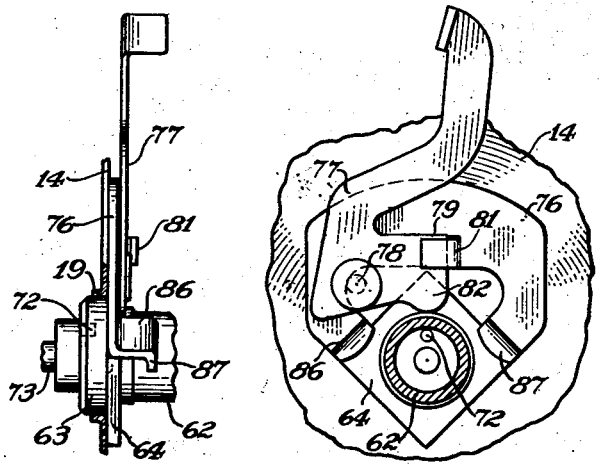
INVENTOR.
Paul A. Stephenson
BY Lewis A. Wright
Atty.

March 2, 1954 P. A. STEPHENSON 2,670,679
DUPLICATOR CYLINDER BEARING
Filed June 11, 1949 2 Sheets-Sheet 2

INVENTOR.
Paul A. Stephenson
BY Lewis A. Wright
Atty.

Patented Mar. 2, 1954

2,670,679

UNITED STATES PATENT OFFICE 2,670,679

DUPLICATOR CYLINDER BEARING

Paul A. Stephenson, Evanston, Ill., assignor to A. B. Dick Company, Chicago, Ill., a corporation of Illinois Application June 11, 1949, Serial No. 98,563

4 Claims. (Cl. 101—216)

My invention relates to duplicating or printing machines and the like and particularly to improved means for supporting the rotatable printing cylinders of such machines. It has for its principal object to provide a bearing construction for the purpose designated which will rigidly support the cylinder for rotation on its axis, which will permit ready removal of the cylinder, which will provide for axial adjustment of the cylinder while running and which will prevent damage to the impression roller and other parts of the duplicator while the cylinder is being placed in operative position in the machine.

Heretofore, the cylinders of such machines have been supported by means of rotatable trunnions journaled in bearings carried by the frame members of the machine. One of the trunnions is provided with a driving connection to the cylinder and is adapted to be positively driven, as by a train of gearing, either from an electric motor or from a hand operated crank in the well-known manner. The other trunnion has heretofore been slidably movable in its bearing so that it could be axially retracted for removal of the cylinder. Since the cylinders of machines of this nature ordinarily weigh 20 lbs. or more and are awkward to handle, it has been a matter of some difficulty to position a cylinder between the frame members of the machine and hold it in alignment with the bearings while the axially movable trunnion was brought into engagement. For this reason cylinders were frequently permitted to pass the position of alignment so as to rest upon or strike against the impression roller, the paper feeding mechanism, and other comparatively fragile parts of the machine causing considerable damage to such parts and to the cylinder.

Another object of the present invention is to provide means whereby a cylinder may be accurately aligned on its bearing axis and supported in this position while the supporting bearings are engaged, without coming in contact and damaging adjacent portions of the machine.

Other objects of the invention will appear from the following description taken in connection with the drawings, which form a part of this specification, and in which:

Fig. 1 is a view, partially in elevation and partially in vertical section through the axis of a duplicator cylinder and its associated bearings.

Fig. 6 is a fragmentary end elevation of the right cylinder head showing the position of the trunnion bearing and its centering flange when assembled.

Fig. 7 is an end elevation of the parts shown in Fig. 6.

Fig. 8 is an end elevation of the trunnion bearing looking from the cylinder outward toward the right in Fig. 1.

Figure 2:
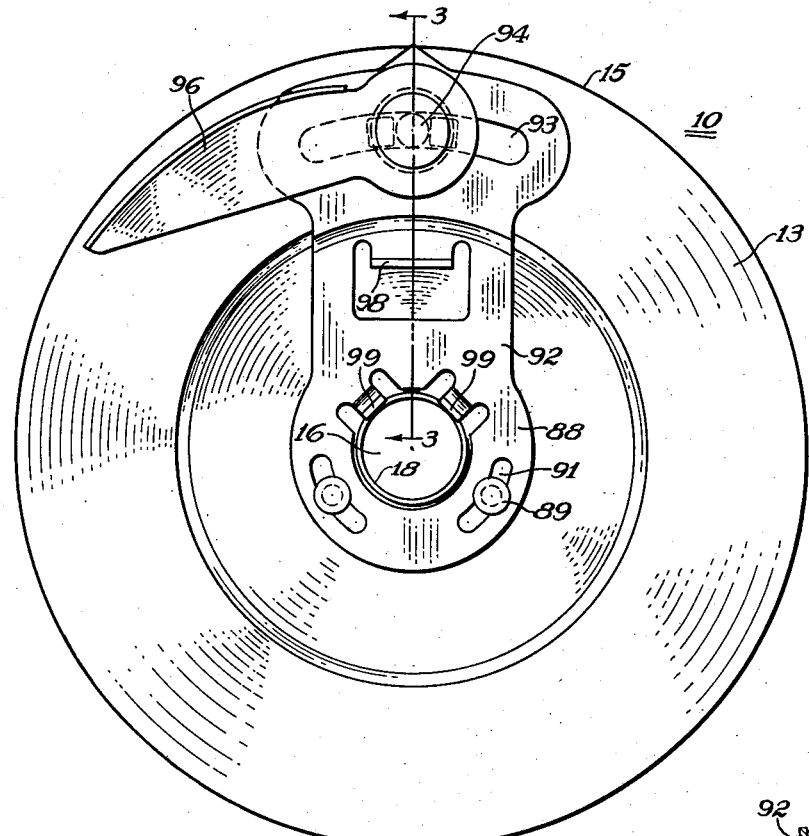
Fig. 2 is a view in elevation of the left or drive end of the duplicator cylinder shown in Fig. 1, showing the relative position of the impression roller.

Referring to the drawings, at 10 is shown generally the printing cylinder of a duplicating machine of a type to which my invention is applicable, such as the well-known stencil duplicator. The cylinder 10 is adapted to cooperate with an impression roller, indicated at 11 in Fig. 2, to form a printing couple between which sheets of impression paper are fed in succession to produce prints. The invention has been described in connection with a duplicator in which the printing member is a stencil 12 carried on the surface of the cylinder 10 and fed with ink from a suitable source within the cylinder. It will be understood, however, that my invention is not limited to duplicators of this type.

The cylinder 10 comprises a pair of spaced head members 13 and 14 of circular disk-like formation which are rigidly secured to and joined by a substantially cylindrical surface 15. Part of the surface 15 is a foraminous diaphragm adapted to support the stencil 12 and to pass ink thereto through a suitable ink pad, the remainder comprising head and tail clamp members and a suitable cover plate. Since duplicator cylinders of this nature are well-known in the art, detailed showing and description thereof is unnecessary and has been omitted. The cylinder is adapted for rotation on its axis in operative contact with the impression roller 11, in the well-known manner, for which purpose it is provided with suitable supporting bearings adapted to align and retain it on the axis of rotation. For cooperation with these bearings, the heads 13 and 14 are formed with axially disposed openings 16 and 17 respectively, which are preferably formed with annular flanges 18 and 19.

The support structures constitute bearings of the trunnion type which are supported on spaced side frame members 21 and 22 of the duplicator. The left-hand or driving trunnion 23 comprises a shaft journaled in and axially positioned by a suitable bearing 24 carried by the frame member 21. It is provided at its outer end with driving means, such as a gear train usually employed for this purpose, not shown. The inner end of the shaft 23 is an easy sliding fit in the opening 16 so that the cylinder will be aligned on the left side by contact of the annular flange 18 with the surface of shaft 23 when the cylinder is in operative position. Adjacent the bearing 24 the shaft 23 carries a driving disk 26, rigidly secured thereto, the periphery of which is formed with a notch 27 having laterally disposed ears 28 at each side thereof, through which the cylinder may be driven.

Rigidly secured to the frame member 22 on the right side of the machine is a bracket plate 31 having a portion parallel to and spaced from the frame member 22 as indicated in Fig. 1, in which the right-hand bearing structure is mounted. This structure includes a bearing 32 rigidly mounted in and projecting through the plate 31 in alignment with the axis of rotation. Pivotally mounted in the supporting bearing 32 is a sleeve 33 projecting inwardly through the plate 31 toward the side frame member 22. The outer end of the sleeve 33 is closed by a cap member 34, which may be integral with the sleeve and formed with an extension 36 providing a lever arm by which the sleeve may be oscillated within the bearing 32. The sleeve 33 is axially positioned within the bearing 32 between its cap 34, which contacts the outer end of the bearing 32, and a latch 37 adapted to engage in an annular groove 38 provided in the outer surface of the sleeve. This latch member 37 is pivotally mounted as at 39 on the bracket plate 31 and is urged into engagement with the groove 38 by means of a spring 41 as clearly shown in Fig. 4. The latch 37 is also provided with a projecting handle portion 42 by means of which the latch may be depressed against the action of spring 41 to release the sleeve 33 and permit it to be withdrawn from the bearing 32.

Figure 4:
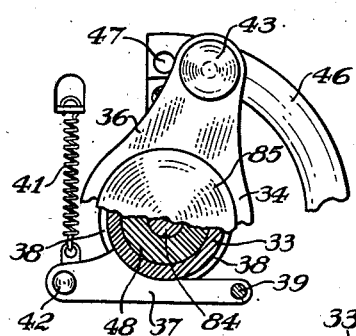
Fig. 4 is a detail view of the end of the right-hand trunnion shown in Fig. 1, partially in end elevation and partially in section substantially on the line 4—4 of Fig. 1.
Figure 5:
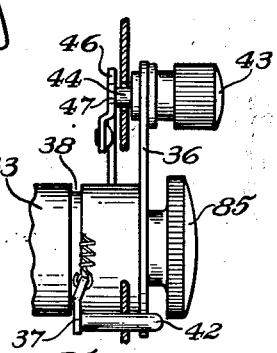
Fig. 5 is a detail view in side elevation of part of the structure shown in Fig. 4.

The lever 36 is also provided with a hand knob 43 by which it may be conveniently oscillated to correspondingly turn the sleeve 33 in the bearing 32. The knob 43 is preferably provided with a spring pressed latch pin 44, adapted to ride upon a segment piece 46 as best shown in Fig. 4, the segment being provided with a hole 47 adapted to be engaged by the pin 44 to retain the sleeve 33 normally in a fixed position.

Slidably mounted in the sleeve 33 and rigidly supported thereby is a trunnion member 48, which projects from the open inner end of the sleeve and extends through an opening 49 in the frame member 22. The midportion of the trunnion member 48 is formed with a bearing surface 51 of slightly reduced diameter, adapted to engage a bearing 52 mounted on the frame member 22, so that the member 48 is rigidly supported in the axis of rotation. It is also slidably but non-rotatably connected to the sleeve 33 as by means of a key 53, cooperating in a keyway 54, so as to turn with the sleeve in response to pivotal movements caused by oscillation of the lever 36. The inner portion of the trunnion member 48 is formed with a bearing portion 56 of further reduced diameter defining a shoulder 57, and its end is formed with a transverse slot 58 and with an axially disposed threaded hole 59.

The trunnion bearing 61 of this invention is journaled to freely rotate on the bearing portion 56 of the trunnion member 48, being formed for this purpose with an annular bearing portion 62 which extends from the shoulder 57 to the end of the trunnion member. This trunnion bearing 61 is also formed with a projecting annular portion 63, preferably integral with the portion 62 and adapted to make an easy sliding fit in the opening 17 so that the annular flange 19 is in operative contact therewith when the cylinder is mounted for rotation. The portions 62 and 63 of the trunnion bearing 61 are separated by a radially disposed flange 64 of square configuration as clearly shown in Figs. 6 and 8. This flange is adapted to contact the cylinder head member 14 in the region adjacent the opening 17 and to be removably secured to the head member so as to position the cylinder 10 on the axis of rotation, as will be presently described.

Secured to the end of the trunnion member 48 within the annular portion 63 of the trunnion bearing is a clutch and retaining member 66, so formed as to retain the bearing axially in place against the shoulder 57 and also to transmit oscillatory movements of the member 48. For this purpose the member 66 is formed on one side with a transverse rib 67 adapted to seat in the slot 58, and on the other side with a radially disposed slot 68 communicating with a centrally counterbored portion 69 communicating with the threaded hole 59. The member 66 is removably retained in position by means of a screw 71 seated in the counterbore 69 and engaging the threaded hole. It will be apparent that the retaining member 66 is secured to the end of the trunnion member 48 in such manner as to engage the annular bearing portion 62, so that this portion is retained against axial movement between the member 66 and the shoulder 57. Accordingly, the trunnion bearing 61 is rotatably journaled on the trunnion member 48 but is axially fixed thereon.

The radial slot 68 is so disposed as to be engageable with a crank pin 72 formed on the end of a shaft 73 pivotally mounted within the cylinder 10 in any convenient manner, not shown. This shaft 73 may be utilized for the oscillatory operation, at intermittent intervals as required, of ink distributing mechanism in any conventional construction mounted within the cylinder in the manner which is well-known in this art. In this way the shaft 73 may be oscillated from the outside of the machine, and while the machine is running, by turning the handle 43 through an arc as previously described. Such oscillatory motion is transmitted through the lever 36 to the sleeve 33 and thence by means of the key 53 to the trunnion member 48, the member 66 and the pin 72 to the shaft 73.

Means is also provided whereby the cylinder 10 may be axially positioned in the machine and laterally adjusted while the machine is running, for which purpose the cylinder may be removably secured to the flange 64 of the trunnion bearing. Rigidly secured to the cylinder head 14 is a bracket member 76, best shown in Figs. 1 and 6, on which a latch lever 77 is pivotally mounted as at 78. This latch lever 77 is provided with a portion 79 which may be swung into engagement behind a lug 81 formed on the bracket member. It is also formed with a latch portion 82 which may be moved into position to overlap and retain the flange 64 as clearly shown in Fig. 6. With the lever 77 in its retracted position the trunnion bearing is moved axially toward the cylinder to engage the flange 64 against the head member 14. Pivotal movement of the lever 77 then moves the portion 82 to overlap the flange and secure the cylinder thereto.

To provide axial movement of the trunnion bearing 61, the trunnion member 48 is provided at its outer end with a threaded bore 83, cooperable with an adjusting screw 84 which is journaled in the cap member 34 by any suitable bearing. The screw 84 projects through the cap member 34 and is provided with a knob 85 by which it may be turned to advance or retract the trunnion member 48 in the sleeve 33 as required. In this manner the trunnion bearing 61 may be retracted to permit the cylinder to be placed in position between the supporting members 23 and 63, and may then be advanced by means of the screw 84 so as to move the annular portion 63 into the opening 17 and into engagement with the annular flange 19.

My invention also contemplates means whereby the cylinder may be accurately and easily placed in position in the machine with its openings 16 and 17 in alignment with the cooperating bearing parts 23 and 63 respectively. To this end the bracket 76 is formed with laterally extending spaced ears 86, having hooked end portions 87, which ears are arranged at an angle of 45 degrees to the vertical so as to engage two adjacent sides of the square flange 76 in the manner clearly shown in Fig. 6. It will be evident that this construction is so arranged as to automatically turn the trunnion bearing 61 as the cylinder 10 is lowered into position between the side frame members, so that the diagonal of the flange 64 is in a vertical position and the weight of the cylinder is equally divided between the two upper edges of the square flange. The ears 87 are so proportioned and arranged that when they are resting on the edges of the flange 64 as indicated the axis of the trunnion is in line with the axis of the cylinder and the trunnion bearing member 63 may then be moved laterally into the opening 17 in the manner previously described.

Figure 3:
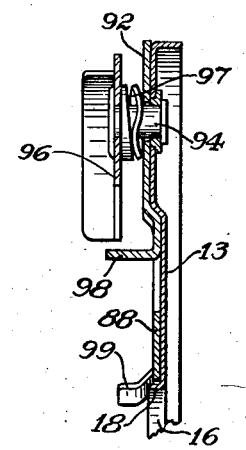
Fig. 3 is a detail sectional view taken substantially on the line 3—3 of Fig. 2.

On the other cylinder head 13, the outwardly disposed annular flange 18, pivotally supports a circular hub 88, secured to the head 13 as by means of headed bolts 89 arranged in slots 91 so as to permit a limited pivotal movement of the hub 88 about the flange 18. The hub 88 is also formed with a radially disposed lever portion 92 having an enlarged end with an arcuate slot 93, as best shown in Fig. 2. Mounted on the head 16 and disposed to pass through the slot 93 is a stud 94 provided at its outer end with a suitable handle 96. Suitable locking means of any convenient construction is employed to lock the lever 92 to the cylinder head 16, as for example the cam washers 97 indicated in Fig. 3. Also formed on the lever 92 is a driving lug 98 adapted to engage in the notch 27 of the driving disk 26 whereby the cylinder may be driven as previously described.

Formed on the lever hub 88 adjacent the flange 18 are a pair of laterally and downwardly projecting ears 99 which are adapted to engage the trunnion shaft 23 when the cylinder is lowered into position between the side frame members of the machine. These ears 99 are so disposed and spaced that when they are in contact with the trunnion shaft as shown in Figs. 1 and 2, the left-hand side of the cylinder will be supported with its axis of rotation in alignment with the axis of the trunnion 23.

It will be observed that by means of the construction above described the angular position of the cylinder 10 with respect to the driving disk 26 may be adjustably varied. Accordingly, the position of the first stencilized line of the stencil 12 may be raised or lowered, if desired, with respect to the leading edge of the impression paper. At the same time the driving arm 92 may be rigidly clamped to the cylinder in the position of adjustment as selected.

The operation of my bearing construction will be readily understood from the foregoing description, and it will be evident that the cylinder may be readily removed from the machine by first operating the latch lever 77 so as to disengage the latch portion 82 from the flange 64. The knob 85 is then turned so as to retract the trunnion member 48 to its extreme right-hand position. This movement first withdraws the bearing portion 63 from the opening 17, leaving the right-hand side of the cylinder supported on the ears 86. After the bearing 63 has been disengaged, the flange 64 will be engaged by the hooked ends 87 of the ears 86 so that the cylinder will be drawn to the right until the bearing 23 has been disengaged from the opening 16, leaving the left-hand side of the cylinder supported upon the ears 99. In this position the cylinder may be lifted straight up and out of the machine.

In the reverse operation the cylinder is picked up, an operation requiring both hands, and lowered into the machine between the side frame members 21 and 22 until the ears 86 and 99 come into contact with the flange 64 and the bearing 23 respectively. This stops the lowering movement of the cylinder at exactly the point at which its axis is in line with the axis of rotation and prevents it from striking against the impression roller 11, the paper feed mechanism or other portions of the machine. The knob 85 is now turned to advance the trunnion member 48 so that the bearing portion 63 enters the opening 17 and the flange 64 engages the side face of the cylinder head 14. Continued movement of the trunnion member 48 will then move the cylinder toward the left until the bearing 23 enters the opening 16 and the driving lug 98 engages in its notch 27. The latch 77 is then closed to engage the outer face of the flange 64, in the manner previously described, and the cylinder may be adjusted in either direction until it is in the desired position for the copy to be duplicated.

It will also be noted that this mechanism provides means for making small adjustments in the axial position of the cylinder, without stopping the machine. Thus the matter which is printed upon the impression sheets can be shifted a small amount to the right or to the left by moving the cylinder, and with it the stencil 12, in the appropriate direction so as to place the resulting print in the proper location on the impression sheets.

It will be understood that various forms of my invention other than those described above may be used without departing from the spirit or scope of the invention.

What I claim is:

1. In a duplicating machine having a rotary printing cylinder including heads formed with axially disposed openings and having an axially disposed shaft within the cylinder, a trunnion member adjustable axially of the cylinder and pivotally movable about said axis, a trunnion bearing journaled on said trunnion member engageable in said head opening to rotatably support the cylinder, and a clutch member carried by the trunnion member extending through and axially engaging the trunnion bearing adapted to retain said bearing and to connect the trunnion member to said cylinder shaft.

2. In a duplicating machine having a printing cylinder including a head member formed with an axially disposed opening, a rotatable trunnion bearing engageable in said opening and formed with a square flange having an inner face engageable with the head member, spaced ears carried by the head member and engageable with the flange to automatically align said head opening with the trunnion bearing, and a latch member carried by the head member pivotally movable into retaining engagement with said flange.

3. In a duplicating machine having a printing cylinder including a head member formed with an axially disposed opening, a rotatable trunnion bearing engageable in said opening and formed with a square flange having an inner face engageable with the head member, spaced ears carried by the head member and engageable with adjacent edges of said square flange to automatically align the head opening with the trunnion bearing, and threaded means to move the trunnion bearing axially, said ears being forms with hook portions engageable with the outer face of the flange.

4. In a duplicating machine having a printing cylinder including rigidly secured head members at each end thereof, aligned trunnion bearings adapted rotatably to support the cylinder through said head members, one said head member being axially slidable on its cooperating trunnion bearing, means axially to adjust the other trunnion bearing, and pivoted latch means carried on the cylinder removably to secure the other head member to the adjustable trunnion bearing for transmission to the cylinder of axial adjustments of said bearing in both directions.

PAUL A. STEPHENSON.

References Cited in the file of this patent

UNITED STATES PATENTS

| Number | Name | Date |
|---|---|---|
| 975,299 | Smith, Jr. | Nov. 8, 1910 |
| 1,737,378 | Littel | Nov. 26, 1929 |
| 1,816,948 | Wood | Aug. 4, 1931 |
| 2,460,504 | Huebner | Feb. 1, 1949 |

FOREIGN PATENTS

| Number | Country | Date |
|---|---|---|
| 508,383 | Germany | Sept. 26, 1930 |